Sept. 1, 1953 — K. H. McPHEE ET AL — 2,650,683
METAL-TO-CERAMIC SEAL
Filed Nov. 3, 1949 — 2 Sheets-Sheet 1

INVENTORS
KENNETH H. McPHEE
HARRY W. SODERSTROM
BY John J. Rogan
ATTORNEY

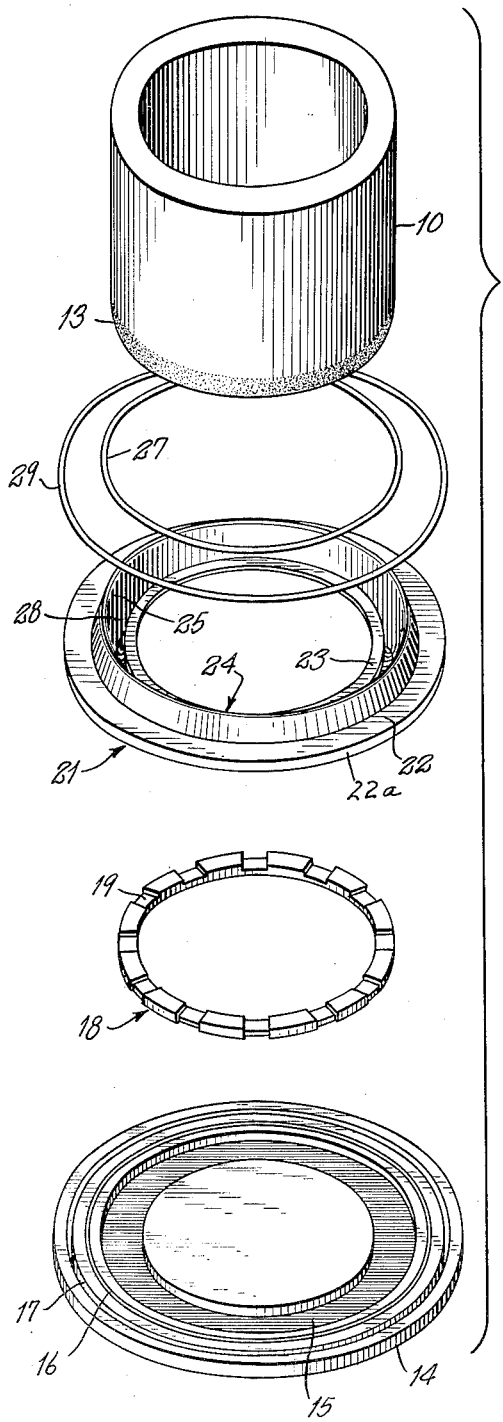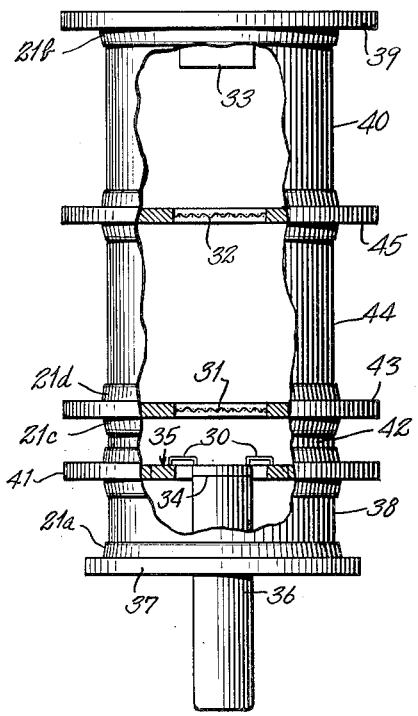

Patented Sept. 1, 1953

2,650,683

UNITED STATES PATENT OFFICE 2,650,683

METAL-TO-CERAMIC SEAL

Kenneth H. McPhee and Harry W. Soderstrom, Cedar Rapids, Iowa, assignors to Collins Radio Company, Cedar Rapids, Iowa, a corporation of Iowa Application November 3, 1949, Serial No. 125,354

8 Claims. (Cl. 189—36.5)

1

This invention relates to the art of vacuum-tight sealing, and more especially to seals for highly evacuated devices such as electron tubes and the like.

A principal object of the invention is to provide an improved vacuum-tight bond or seal between metal and ceramic members.

Another object is to provide a novel arrangement for integrally bonding a tubular insulator member, for example a ceramic, to a metal member through the intermediary of a novel sealing ring.

A feature of the invention relates to a metal-to-ceramic seal for evacuated devices, wherein a novel metal sealing ring is employed, the bonded ceramic and sealing ring being supported on a separate annular member which takes the various thrusts exerted on the ceramic and sealing ring, while permitting the ceramic and ring to move in perpendicular directions in response to heat changes without destroying the effectiveness of the seal.

Another feature relates to a novel vacuum-tight sealing arrangement between a tubular ceramic member and a metal disc-like member, wherein the ceramic member is bonded to a specially-shaped flexible metal sealing ring having an outer peripheral flange which is sealed to the said metal member, and an inner peripheral flange which is in slidable engagement with a separate support ring which is sandwiched between the said inner flange and said disc-like member.

Another feature relates to a novel metal-to-ceramic seal employing a sealing ring which has inner and outer flat margins or flanges, and with an intervening section having a portion bent back upon itself, the inner margin of the sealing ring being bonded to the end of the ceramic member, and the outer margin of the sealing ring being bonded to the metal member of the seal.

A further feature relates to a novel metal sealing ring for evacuated devices such as electron tubes and the like.

A further feature relates to a sealed joint between a tubular ceramic body and a metallic disc-like member, and particularly useful in an evacuated electron discharge device. The joint according to the invention has a novel arrangement of rings whereby one ring functions primarily as an expansible sealing member, while the other ring serves to provide the required support and mechanical strength to the seal to resist the pressure of the outside atmosphere when the device is highly evacuated.

2

A still further feature relates to the novel organization, arrangement and relative location and interconnection of parts which cooperate to provide an improved metal-to-ceramic sealed joint.

In the drawing which is illustrative of one preferred embodiment,

Fig. 4 is an exploded view showing the manner of assembly of the parts of the joint.

Fig. 5 is a generalized external view of a typical electron discharge tube embodying a sealed joint according to the invention.

Figure 1:
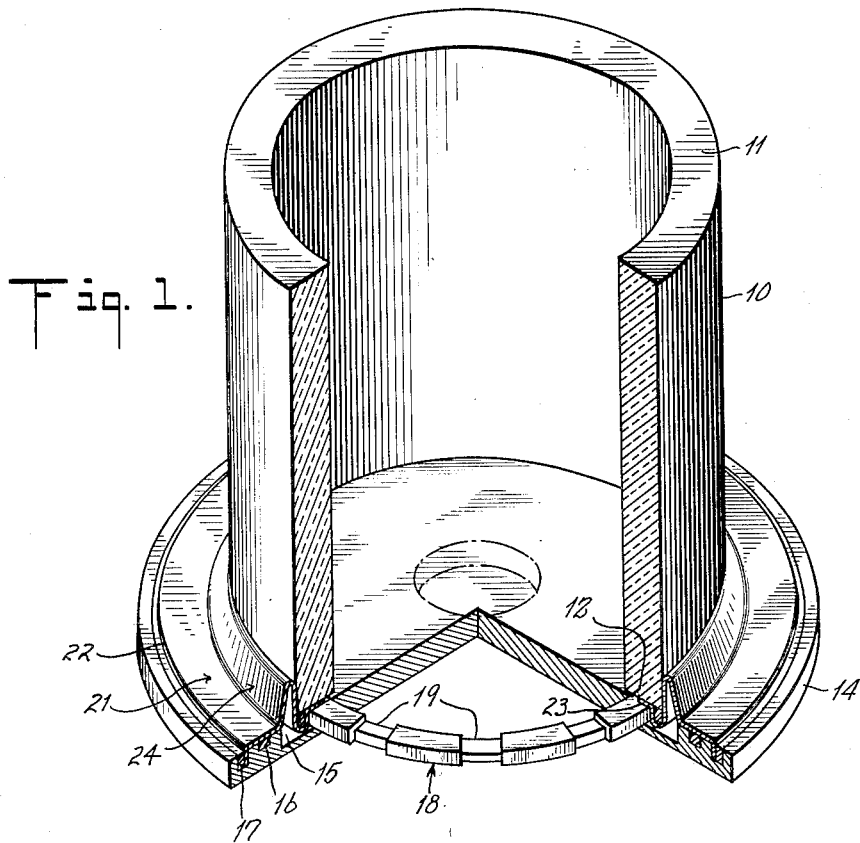
Fig. 1 is a perspective and partly sectional view of a sealed joint according to the invention.
Figure 2:
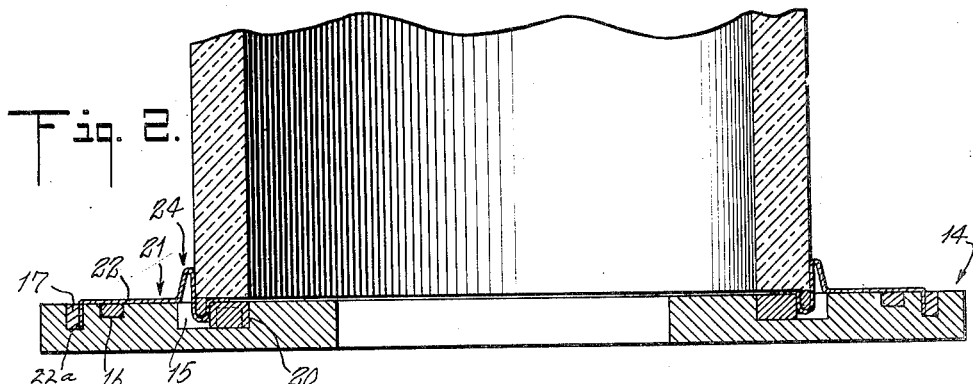
Fig. 2 is a portion of an enlarged central section of Fig. 1.
Figure 3:
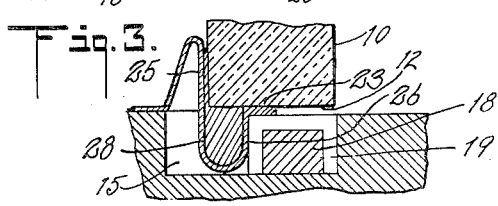
Fig. 3 is a further enlarged view of part of Fig. 2.

Referring to Figs. 1 to 4, there is shown one typical form of sealed joint according to the invention. This joint may comprise a cylindrical or tubular ceramic body 10 having smooth flat end walls 11, 12. The lower end of body 10 on the outer cylindrical surface and on the flat face 12, is provided with a metallized coating 13 (see Fig. 4) which may be applied by spraying, coating dipping, brushing, etc. This metallized coating may be of any well-known type, for example copper, brass, solder, silver, etc., which is capable of being easily "wet" when in contact with a melted brazing or soldering material. While Fig. 1 shows a seal only at the lower end of member 10, it will be understood that, if desired, a similar seal may be provided at the upper end. The ceramic member 10 is arranged to be vacuum-tight sealed to a metal base or disc-like member 14 which may be unperforated or which may have a central opening, as indicated by the dot-dash lines in Fig. 1, and as indicated in section in Fig. 2. The member 14 which may for example be of copper, has a main relatively wide annular groove 15 in its upper face, and a pair of outer concentric but narrower annular grooves 16, 17. Seated in groove 15 is a ring 18 of stainless steel or similar hard metal or alloy which is not readily "wettable" and does not bond to the usual brazing or soldering materials. Preferably, although not necessarily, the ring 18 has a thickness which is substantially the same as the depth of groove 15, and has a radial width which is materially less than the width of groove 15. For example, the width of ring 18 may be approximately one-half the width of the groove 15. Ring 18 is provided with a series of reduced-thickness and reduced-width sections 19 for purposes to be described. The ring 18 preferably has an internal diameter which is slightly greater than the diameter of the inner wall 20, so as to freely seat within the groove 15. For providing the necessary vacuum-tight seal, there is an annular sealing ring 21 having an outer flat margin 22 with a downwardly extending lip 22a, and a coplanar inner flat margin 23. These two margins are joined by an integral and doubly bent-back section 24 having a central vertically flat portion 25 which is adapted to seat against the metallized periphery 13 of the ceramic member 10. The downwardly bent portion 26 is formed so that it is at right angles to the inner margin 23, and the width of this bent-back portion is such that when the ring 21 is mounted on the ring 18, as shown in Figs. 1, 2 and 3, the vertical section 25 presses tightly against the peripheral surface of member 10. Before assembly of the ceramic member 10 within the vertically-bent portion of ring 21, a ring 27 (see Fig. 4) of solder, brass, nickel, or other similar material is dropped into the channel 28. Likewise, before placing the ring 21 on the base 14, another ring 29 of solder, brass, nickel, or other brazing alloy, is dropped into the groove 16. The parts assembled in the relation shown in Figs. 1 to 3, are placed into a suitable furnace, and heated sufficiently to melt the rings 27 and 29. By capillary action, the molten soldering or brazing material seeps between the metallized peripheral face of member 10 and the flat wall 25 of ring 21, and it also seeps between the metallized flat end wall 12 of member 10 and the flat inner margin 23 of ring 21. The assembly is then removed from the furnace and allowed to cool, whereupon the molten soldering or brazing material hardens and forms a vacuum-tight seal between the parts. If desired, an additional ring of solder or brazing material can be dropped into the groove 17, and it can be melted or brazed in a similar manner to that described above. If desired, the lip 22a can be spun downwardly after assembly, or it can be formed as an integral downward lip prior to assembly of the disc 21 with ring member 14.

During the brazing or soldering operation, the ring 18 does not become "wet" by the soldering or brazing material, and no permanent bond is effected between the ring 21 and the ring 18. This is necessary since the ring 18 performs the function merely of carrying all the stresses that may be exerted on the bond as a result of outside atmospheric pressure when the joint forms part of an evacuated receptacle. In such evacuated devices, the ceramic-to-metal seals are subject to very little forces of tension since because of the outside atmospheric pressure they are always under compression. However, because of the particular characteristics of the sealing ring 21 and its bonding to the ceramic 10, and because of the use of a separate unbonded thrust-taking ring 18, the sealed joint is capable of expansion and contraction without in any way affecting its sealing qualities. When the joint becomes heated for any reason during use, the metal base or member 14 expands faster than the ceramic 10. However, since the ring 18 is free and not bonded to the ring 21 or to the base 14, relative motion may occur between base 14 and the ceramic 10, but without destroying in any way the seal between the ceramic 10 and the ring 21. Likewise, on cooling and contracting of the joint, relative motion may occur between the ceramic and the base 14 without affecting the sealing qualities of the joint. When the sealed joint forms part of the evacuated space of an electron discharge device, or the like, the channels formed by the cut-away portions 19 of ring 18 provide free passages between the interior of the device and the groove 15, thus facilitating evacuation of the device and preventing entrapped air from staying in the groove 15 subsequent to sealing.

It is believed that the manner of assembly of the parts to form the joint will be clear from the foregoing description, particularly with reference to the exploded view of Fig. 4. To assemble the parts, the ring 18 is first placed within the groove 15 in base member 14. The solder or brazing ring 27 is then dropped into the channel 26, and the additional solder or brazing ring 29 is dropped into groove 16. The sealing ring 21 is then assembled on member 14 and ring 18, and if desired, the outer margin of ring 21 can be spun downwardly into groove 17. If desired, an additional solder or brazing ring can be dropped into groove 17. The ceramic member 10 is then assembled with its flat end 12 in engagement with the inner flat margin 23 of ring 21, and with its outer metallized periphery 13 in engagement with the vertical bent-back portion 25. The assembly is then heated in any convenient manner to melt the various solder or brazing rings as above described, and the joint is then allowed to cool to allow the molten brazing or soldering material to harden.

While the joint according to the invention is not limited to any particular kind of evacuated device, there is shown in Fig. 5, in generalized form, an electron discharge tube having a thermionic electron emitting cathode 30, electron permeable grids 31, 32, and an anode 23. The cathode 30 may be of any well-known type, such for example as disclosed in application Serial No. 28,984, filed May 25, 1948, now Patent No. 2,510,171, issued June 6, 1950, consisting of a plurality of radially-extending filament or cathode strips which are bridged across a central metal member 34 and a spaced surrounding metal member 35. The metal member 34 is connected to a suitable metal sleeve 36 which connects all the inner ends of the filament sections together in parallel, and the outer ends of these sections are connected in parallel by the member 35, thus enabling heating current to be supplied to the filament. The member 36 may be carried by a metal disc 37 which is similar to member 14 and which is sealed to a tubular ceramic member 38 by a sealing ring 21a similar to ring 21, such as illustrated in Figs. 1 to 4. Likewise, the anode 33 can be attached to a metal disc 39, which disc can be similar to disc 14 and sealed to a tubular ceramic member 40 by a sealing arrangement 21b, such as illustrated in Figs. 1 to 4.

The member 35 can be integrally united to form part of the metal disc 41 which is similar to disc 14, except that it has sealing grooves on opposite faces thereof, so that this disc 41 can be sealed to the ceramic 38 as above described, and can also be sealed to another tubular ceramic member 42. Likewise, the grid 31 can be mounted in an annular metal disc 43 carrying sealing grooves on opposite faces and respective sealing rings 21c, 21d, therein, so that this disc can be sealed to ceramic 42 and to ceramic 44. Similarly, the grid 32 can be carried by a metal disc 45 which is sealed to the ceramic 44 and to the ceramic 40 in a similar manner. It will be understood, of course, that the showing of Fig. 5 is merely a generalized or schematic showing of one array of electrodes within an evacuated device, a wall or envelope portion of which is constituted mainly of ceramic and the connections to the various electrodes of which are effected by the various disc-type seals above noted. A typical tube of this type is known in the art as a Resnatron. It will be understood, however, that the invention is not limited to any particular design of electron tube or other evacuated device, but is capable of use in any situation where a vacuum-tight seal is to be provided between a metal member such as a metal disc and a ceramic or other insulating tubular member.

While one particular embodiment has been disclosed herein, it will be understood that various changes and modifications may be made therein without departing from the spirit and scope of the invention.

What is claimed is:

1. A sealed joint for evacuated devices, comprising a tubular insulator having an annular end face at one end which is substantially flat, a metal member, and means sealing said metal member to said end of the tubular insulator, said means including a metal sealing ring having inner and outer flat portions joined by an intervening flexible portion extending at substantially right angles to said flat portions, the inner flat portion of said sealing ring being in contact with the flat face at the end of said insulator and said intervening portion being in contact with the peripheral end of said insulator, sealing material between said sealing ring and said end of said insulator, and a separate rigid ring located between the said flat end face of said insulator and said metal member receiving the end thrust between said insulator and said metal member in response to temperature changes in said insulator while allowing said intervening portion to flex.

2. A sealed joint according to claim 1 in which said intervening portion of said sealing ring is reversely bent with respect to said flat portions rendering said sealing ring flexible in the region where it is sealed to said insulator.

3. A sealed joint according to claim 1 in which said metal member has an annular groove and said sealing ring has a section of said intervening portion in the form of a trough located in said groove, and said separate rigid ring is located between said trough and the inner wall of said annular groove.

4. A sealed joint according to claim 3 in which the said separate rigid ring is unbonded to said first-mentioned sealing ring.

5. A sealed joint according to claim 4 in which said separate rigid ring has a plurality of transverse grooves providing communication between the sections of said annular groove located on opposite sides of said trough.

6. A sealed joint according to claim 5 in which said separate rigid ring is of a metal which is not readily wet by said sealing material.

7. A sealed joint according to claim 6 in which said separate rigid ring is of stainless steel.

8. A sealed joint according to claim 1 in which the said outer flat portion of said sealing ring is soldered to said metal member.

KENNETH H. McPHEE.
HARRY W. SODERSTROM.

References Cited in the file of this patent

UNITED STATES PATENTS

| Number | Name | Date |
|---|---|---|
| 2,066,856 | Rope, Jr. | Jan. 5, 1937 |
| 2,075,477 | Smith | Mar. 30, 1937 |

FOREIGN PATENTS

| Number | Country | Date |
|---|---|---|
| 222,061 | Switzerland | June 30, 1942 |

OTHER REFERENCES

Product Engineering, December 1947, pages 154–157.